United States Patent
Schoonover et al.

(10) Patent No.: US 9,377,993 B2
(45) Date of Patent: Jun. 28, 2016

(54) METHOD OF SAMPLING AND STORING DATA AND IMPLEMENTATION THEREOF

(71) Applicant: Dresser, Inc., Addison, TX (US)

(72) Inventors: Larry Gene Schoonover, Falmouth, MA (US); Arkady Khasin, Acton, MA (US); Vladimir Dimitrov Kostadinov, Sharon, MA (US); Justin Scott Shriver, Newton, MA (US)

(73) Assignee: Dresser, Inc., Addison, TX (US)

( * ) Notice: Subject to any disclaimer, the term of this patent is extended or adjusted under 35 U.S.C. 154(b) by 63 days.

(21) Appl. No.: 14/307,006

(22) Filed: Jun. 17, 2014

(65) Prior Publication Data

US 2015/0052269 A1 Feb. 19, 2015

Related U.S. Application Data

(60) Provisional application No. 61/866,856, filed on Aug. 16, 2013.

(51) Int. Cl.
   G06F 3/00    (2006.01)
   *G06F 5/06*    (2006.01)
   *G06F 7/14*    (2006.01)

(52) U.S. Cl.
   CPC  *G06F 5/065* (2013.01); *G06F 7/14* (2013.01); *G06F 2205/061* (2013.01)

(58) Field of Classification Search
   CPC ..... G06F 5/065; G06F 7/14; G06F 2205/061; G06F 5/06; G06F 2205/126
   See application file for complete search history.

(56) References Cited

U.S. PATENT DOCUMENTS

| | | | |
|---|---|---|---|
| 3,235,849 A | 2/1966 | Klein | |
| 5,416,724 A | 5/1995 | Savic | |
| 6,014,612 A | 1/2000 | Larson et al. | |
| 6,819,732 B1 * | 11/2004 | Savell | G06F 5/12 375/371 |
| 6,857,043 B1 | 2/2005 | Lee et al. | |
| 7,089,086 B2 | 8/2006 | Schoonover | |
| 7,200,691 B2 | 4/2007 | Ali Khan et al. | |
| 7,219,553 B1 | 5/2007 | Worthington | |
| 7,231,265 B2 | 6/2007 | Yasui et al. | |
| 8,589,720 B2 * | 11/2013 | Garudadri | G10L 19/005 713/401 |
| 8,782,355 B1 * | 7/2014 | Jain | G06F 5/10 711/154 |
| 2002/0019916 A1 * | 2/2002 | Henrion | H04Q 11/0478 711/159 |

(Continued)

FOREIGN PATENT DOCUMENTS

WO    2005013639 A2    2/2005

OTHER PUBLICATIONS

International Search Report and Written Opinion issued in connection with corresponding PCT Application No. PCT/US2014/049162 on Dec. 19, 2014.

*Primary Examiner* — Jing-Yih Shyu
(74) *Attorney, Agent, or Firm* — Paul Frank + Collins P.C.

(57) ABSTRACT

Embodiments of methods that are useful to avoid overflow in fixed-length buffers. In one embodiment, the methods dynamically adjust parameters (e.g., sample time) and reconfigure data in the buffer to allow new data samples to fit in the buffer. These embodiments allow data collection to automatically adapt, e.g., by adjusting the sample rate to allow the data to fit in the limited buffer size. These embodiments can configure hardware and/or software on a valve positioner of a valve assembly to improve data collection for use in on-line valve diagnostics and other data processing techniques.

14 Claims, 15 Drawing Sheets

(56) References Cited

U.S. PATENT DOCUMENTS

| | | | |
|---|---|---|---|
| 2006/0085576 A1* | 4/2006 | Kurosawa | G06F 5/08 710/52 |
| 2006/0161799 A1* | 7/2006 | Degenhardt | G06F 1/3203 713/600 |
| 2007/0260771 A1* | 11/2007 | Lee | G06F 5/06 710/29 |
| 2008/0125877 A1 | 5/2008 | Miller et al. | |
| 2009/0024864 A1* | 1/2009 | Sugimoto | G06F 5/06 713/501 |

\* cited by examiner

METHOD OF SAMPLING AND STORING DATA AND IMPLEMENTATION THEREOF

CROSS-REFERENCE TO RELATED APPLICATIONS

This application claims the benefit of priority to U.S. Provisional Patent Application Ser. No. 61/866,856, filed on Aug. 16, 2013, and entitled "Method of Sampling and Storing Data and Implementation thereof." The content of this application is herein incorporated by references in its entirety.

BACKGROUND

The subject matter disclosed herein relates to data collecting and processing techniques with particular discussion about methods that optimize sampling data rates into fixed-length buffers found on valve assemblies.

Industrial factories and like facilities operate process lines that may include many varieties of flow controls. Examples of these flow controls include pneumatic and electronic valve assemblies (also "control valves") that regulate a flow of process fluid (e.g., gas and liquid). In conventional configurations, these valve assemblies have a number of components that work together to regulate flow of process fluid through the valve assembly. These components include a stem, a plug, a seat, and an actuator that couples with the stem to change the position of the plug relative to the seat. The components can also include various linkages and springs that ensure proper movement, e.g., of the stem and/or the plug. In some constructions, the valve assembly incorporates a valve positioner with electrical and/or electro-pneumatic components. During operation, the valve positioner instructs the actuator to change the position of the plug relative to the seat. Often, the valve positioner issues the instructions in response to control signals from a controller that is part of a process control system (also "distributed control system" or "DCS"). The instructions are part of management functions in the DCS that can, inter alia, cause the valve assemblies to operate in a manner that achieves the process parameters set out for the process line.

Data collection and analysis plays an important role at these industrial facilities to monitor operation of the devices on the process line. The data can arise from the devices and areas proximate the devices, e.g., by way of sensors that attach to the device and/or piping that couples with the device. The facility can deploy certain data processing techniques that detect the onset of problems in the devices; for example, the techniques can identify changes in operation of a valve that may indicate damage (e.g., wear, corrosion, etc.) to the seat, the stem, the linkage, the springs, the actuator, and other components of the valve.

Facilities often incorporate large data acquisition systems to collect data across wide swaths of devices that are part of the process line. Stand-alone test beds, or "valve testers," are also available that use sensors and other connections with the devices to gather data during operation in the process line. Some data acquisition can even occur on the device itself, e.g., on valves that are outfit with hardware and electronics to receive, store, and/or transmit data and information that relates to the operation of the valve. This hardware may include a valve positioner, which resides on and/or near the valve and operates the valve to modulate the flow of working fluid. Unfortunately, memory limitations with the microprocessor in the valve positioner often fixes the length of the buffer in memory that holds the data. These limitations can render the buffer too small to hold all of the data for a particular test sample based on, for example, the time between samples, the number of measurements stored for each sample, and the total sampling time. This problem with overprescribing the buffer, or "overflow," may be addressed, on the one hand, by adjusting the time between samples so all of the data could fit in the buffer. However, in practice, this variable is often not known.

BRIEF DESCRIPTION OF THE INVENTION

This disclosure describes improvements to avoid overflow in fixed-length buffers. These improvements embody methods that can dynamically adjust parameters (e.g., sample time) and reconfigure data in the buffer to allow new data samples to fit in the buffer. These methods allow data collection to automatically adapt, e.g., by adjusting the sample rate to allow the data to fit in the limited buffer size. These methods can configure hardware and/or software on a valve positioner of a valve assembly to improve data collection for use in on-line valve diagnostics and other data processing techniques.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

Figure 1:
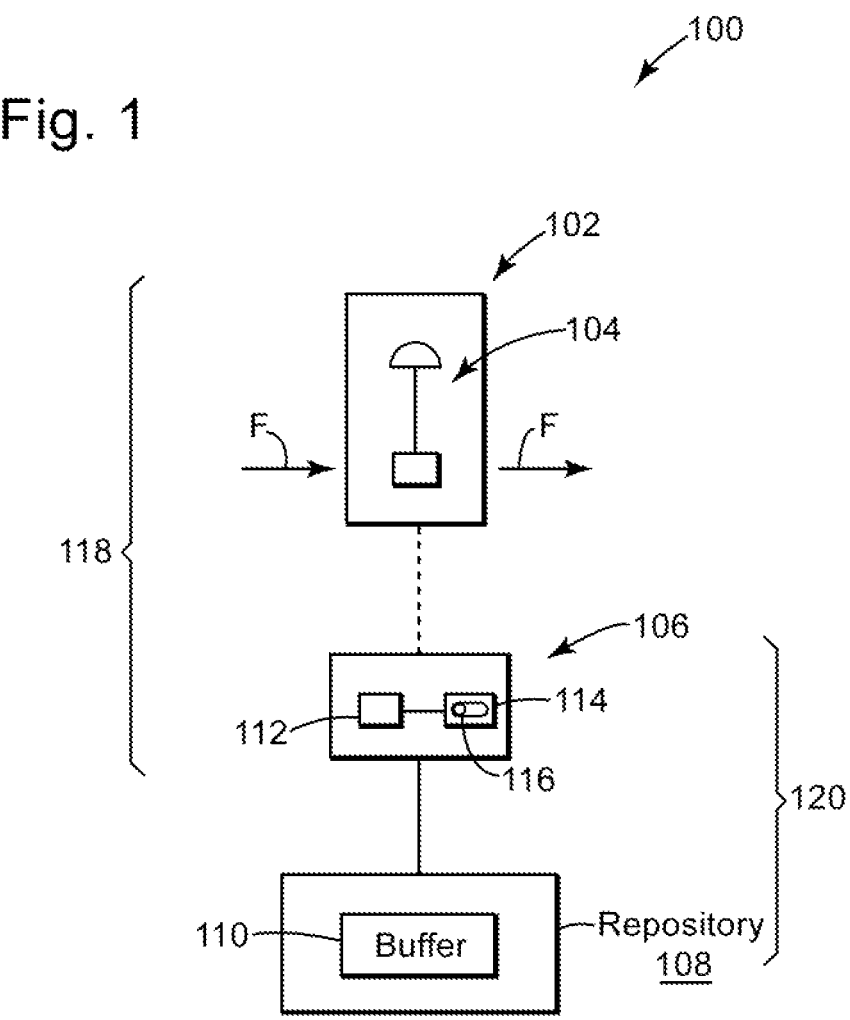
FIG. 1 depicts a schematic diagram of an exemplary embodiment of a system that is configured to facilitate data collection and storage for use in valve diagnostics.

FIG. 1 depicts a schematic diagram of an exemplary embodiment of a system 100 that can facilitate data collection that is useful, for example, for valve diagnostics. The system 100 includes a valve 102 with components 104. Examples of the components 104 can include an actuator, a valve stem, a plug, a seat, and related components that are configured to regulate the flow of a process fluid F through the valve 102. The system 100 also includes a sampling device 106 that couples with the valve 102. The sampling device 106 has access to a repository 108 that includes a buffer 110. As shown in FIG. 1, the sampling device 106 may include a processor 112 and memory 114 with executable instructions 116 stored thereon. Examples of the executable instruction 116 may include all or part of a software program, firmware, and/or related listing of operative instructions that can cause the sampling device 106 to perform one or more operations as described herein. In one embodiment, the valve 102, the sampling device 106, the repository 108, and/or the buffer 110 may be part of a valve assembly 118 with a valve positioner 120 that is configured to control operation of the valve 102. The valve positioner 120 may couple with various part of the system 100, as shown in the construction shown in FIG. 1, and/or may incorporate all or part of the sampling device 106, the repository 108, and the buffer 110. This disclosure also contemplates configurations of the repository 108 and/or buffer 110 that are located remote from the valve assembly 118.

Broadly, the buffer 110 (and the repository 108, generally,) can have a circular data structure with a fixed size, length, and/or capacity. This structure allows the buffer 110 to store only a certain (or "fixed") number of data samples at one time. During operation, the sampling device 104 can continuously acquire data from the valve 102, sampling data a sampling rate that generates a constant stream of data samples that are to be stored, e.g., in the buffer 110. When the capacity of the buffer 110 is reached, the system 100 is configured to modify, or re-configure, the data in the buffer 110. The new configuration allows the buffer 110 to accept additional data samples that the sampling device 106 acquires from the valve 102. In one implementation, the system 100 also changes the sampling rate to correspond the new configuration of the data in the buffer 110.

Figure 2:
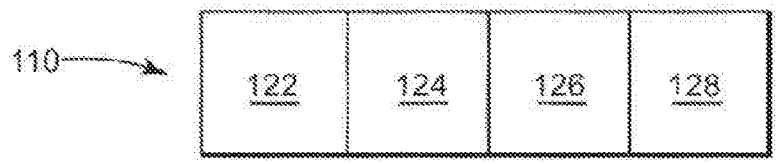
FIG. 2 depicts a detail view of the buffer of the system of FIG. 1.

FIG. 2 provides details of an example of the buffer 110 to illustrate, at a high level, operation of the system 100 to re-configure the buffer 110 to accept one or more additional data samples in excess of the buffer size. The buffer 110 has a plurality of buffer locations to store data. The buffer locations include a first (or lead) buffer location 122, a second buffer location 124, a third buffer location 126, and an fourth (or end) buffer location 128. As noted more below, each of the buffer locations 122, 124, 126, 128 may have a buffer location identifier (also "buffer location") to identify the position of the buffer locations relative to one another in the buffer 110. Table 1 below illustrates one exemplary use of the buffer location identifier for the buffer 110 of FIG. 2,

TABLE 1

| Buffer Location | Buffer Location Identifier |
|---|---|
| 122 | B1 |
| 126 | B2 |
| 128 | B3 |
| 124 | B4 |

Figure 3:
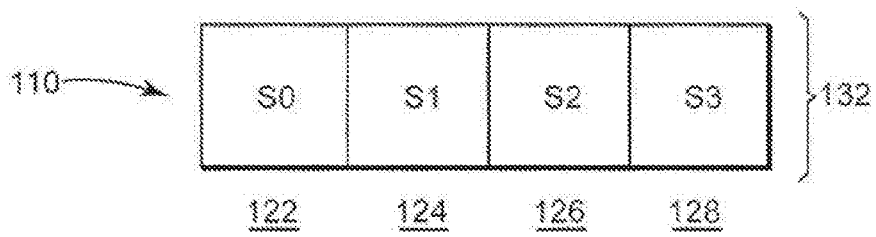
FIG. 3 depicts the buffer of FIG. 2 with data samples in a first configuration.
Figure 4:
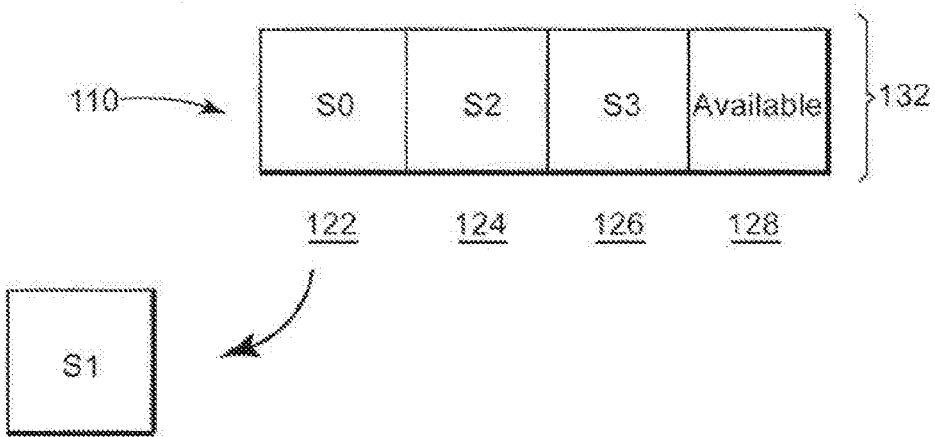
FIG. 4 depicts the buffer of FIG. 2 with a storage location that is available for a new data sample.
Figure 5:
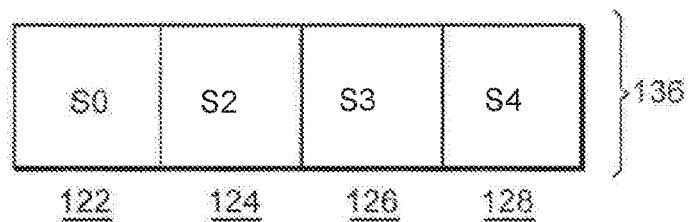
FIG. 5 depicts the buffer of FIG. 4 with data samples in a second configuration.

FIGS. 3, 4, and 5 depict the buffer 110 in various configurations. FIG. 3 illustrates the buffer 110 in a first configuration 132. The data samples comprise a first data sample S0, a second data sample S1, a third data sample S2, and a fourth data sample S3. The labels S0, S1, S2, S3 are also referred to herein as a sample location identifier (also "sample location") (i.e., 0, 1, 2, 3, etc.), which indicates, in one example, the chronological order that the sampling device 106 (FIG. 1) obtains the data samples from the valve 102 (FIG. 1). Examples of this chronological order describes that the first data sample S0 is acquired and/or received before the second data sample S1, the second data sample S1 is acquired and/or received before the third data sample S3, and so forth. In one example, a sampling time T defines the period of time that separates each of the data samples S0, S1, S2, S3, etc.

FIG. 4 shows one implementation of the system 100 (FIG. 1) to accommodate more data in the buffer 110. In this implementation, the system 100 is configured to discard (or remove, overwrite, etc.) the data sample S1 from the first configuration 132 of the buffer 110. The system 100 is also configured to shift the data sample S2 and the data sample S3 to new locations in the buffer 110, namely, to the second buffer location 124 and the third buffer location 126. This shift of data samples creates an empty storage location at buffer location 128, which corresponds with the end of the buffer. Examples of the empty storage location are "available" or "open" to receive a new data sample. FIG. 5 illustrates the buffer 110 in a second configuration 136 that includes the new data sample. In this example, the data samples include a fifth data sample S4 that resides in the previously open buffer location, i.e., the "available" storage location 134.

Figure 6:
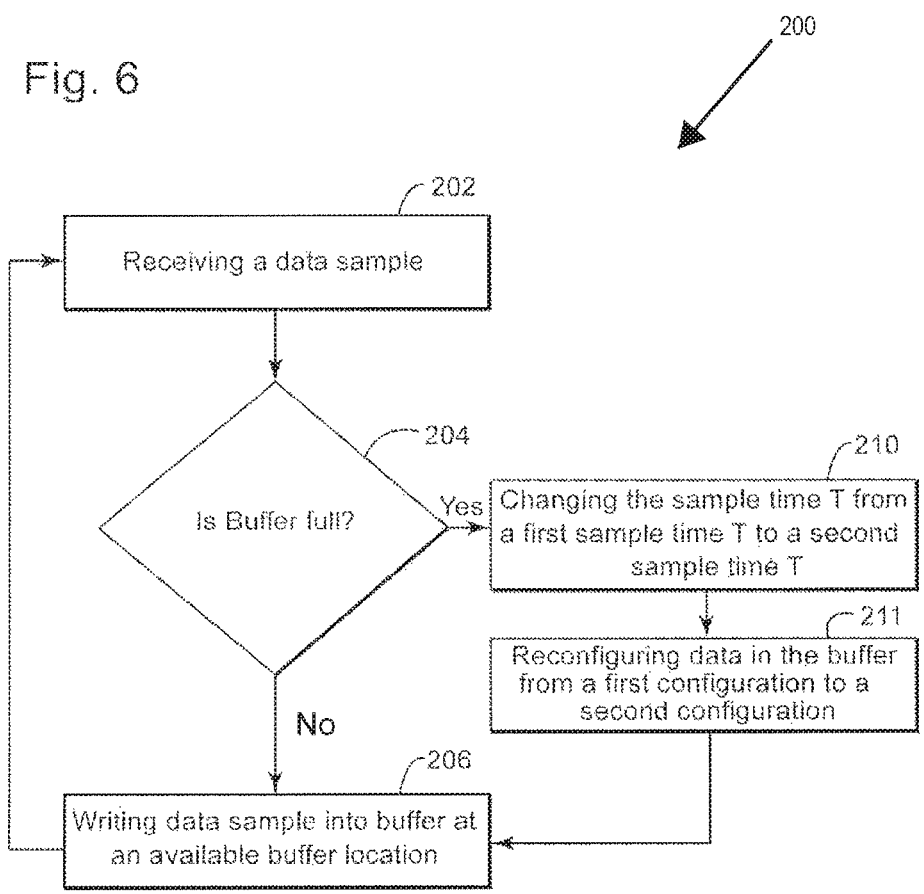
FIG. 6 depicts a flow diagram of an exemplary embodiment of a method for writing data samples into a buffer of fixed length.

FIG. 6 illustrates a flow diagram of an exemplary embodiment of a method 200 that is useful to write data samples into a buffer of fixed length. The method 200 includes, at step 202, receiving a data sample at a first sample time T and, at step 204, determining whether there is an available buffer location that can receive the data sample. If the buffer has an available buffer location, then the method 200 can continue, at step 206, by writing the data sample into the available buffer location and, at step 202, acquiring and/or receiving the next data sample. If there is no available buffer location (i.e., the buffer is "full" or exhibits a "full condition"), then the method 200 can continue, at step 210, changing the sample time T from the first sample time T to a second sample time T and, at step 211, reconfiguring data in the buffer from a first configuration to a second configuration. In one example, the method is configured to identify a storage location for the data sample among the plurality of buffer locations of the buffer.

Embodiments of the method 200 can determine the storage location for new data samples that the system 100 (FIG. 1) collects in excess of the fixed capacity of the buffer. As shown in FIG. 6, these embodiments can include steps to reconfigure data in the buffer all at once, for example, whenever the buffer is full. Other embodiments can also include steps to reconfigure data in the buffer only at times that are necessary to accommodate new data samples, i.e., not necessarily when the buffer is full. These embodiments can change the sample time (e.g., from the first sample time T to the second sample time T), then reconfigure data in the buffer multiple times before the buffer becomes full at the second sample rate. Still other embodiments can reconfigure the buffer simply by identifying particular locations in the buffer for the new data samples. These embodiments reconfigure data in the buffer, not by moving or shifting data from one buffer location to another buffer location, but rather by changing the sample time and/or other parameters to store and retain data in the buffer in non-sequential order.

Unlike conventional sampling techniques for use in valve diagnostics, the embodiments of the present disclosure can include one or more steps that adapt one or more sampling parameters (e.g., sampling time T) to better manage use of the fixed capacity of the buffer to store the myriad of data and information that the valve 102 generates during operation in the field. These steps can include, for example, steps to dynamically adjust the sampling time T, e.g., from a first sampling time to a second sampling time that is different from the first sampling time. In one example, the second sampling time has a value that is greater than the value of first sampling time. This adjustment allows for writing of the new data samples into the buffer at non-contiguous buffer locations (e.g., having buffer locations of 2 and 4). These storage locations may correspond to buffer locations that are "open" to receive the new data sample—often by way of moving and/or shifting previously-stored data samples among the buffer locations. In other examples, the storage locations may correspond with buffer locations in which the new data sample simply overwrites a previously-stored data sample found in the identified buffer location.

Referring back to FIG. 6, the step of receiving a data sample (e.g., at step 202) describes the intake of information that defines operation of the valve 102 (FIG. 1). The information can comprise values for measured data in the form of, for example, one or more operating variables (e.g., setpoint (SP), position (P), and actuator pressure (AP), among others). The values may originate from sensors and other devices that can monitor operation of the valve components (e.g., the actuator, a regulator, a pressure/current converter, etc.). Generally, a data sample may comprise a dataset. Examples of this dataset can group the measured data taken (and/or collected and/or acquired) by the sampling device 106 (FIG. 1) at relatively the same time. The data sample may be part of a time-sequenced collection of datasets, referred to herein as a "sample set" that includes a plurality of data samples (e.g., the data samples S0, S1, S2, S3, and S4 of FIGS. 2, 3, and 4) that the sampling device 106 (FIG. 1) acquires over time. As noted above, the sampling time T can define a time period between each data sample in the sample set.

Table 2 below provides an exemplary arrangement of information that makes up a sample set. The listing of Table 2 arranges the data of the data sample in datasets, discussed above. The datasets are one way in which data is collected and organized for use in evaluating the performance of a valve 102. In the example of Table 2 below, the sample set includes ten datasets, each dataset comprising a value for one or more operating variables, namely, setpoint (SP), position (P), and actuator pressure (AP). Notably, this disclosure contemplates that there are a wide range of other operating variables that may be included in each dataset in accordance with the concepts disclosed herein.

TABLE 2

| Dataset | SP | P | AP |
| --- | --- | --- | --- |
| S0 | SP0 | P0 | AP0 |
| S1 | SP1 | P1 | AP1 |
| S2 | SP2 | P2 | AP2 |
| S3 | SP3 | P3 | AP3 |
| S4 | SP4 | P4 | AP4 |
| S5 | SP5 | P5 | AP5 |
| S6 | SP6 | P6 | AP6 |
| S7 | SP7 | P7 | AP7 |
| S8 | SP8 | P8 | AP8 |
| S9 | SP9 | P9 | AP9 |
| S10 | SP10 | P10 | AP10 |
| S11 | SP11 | P11 | AP11 |
| S12 | SP12 | P12 | AP12 |
| S13 | SP13 | P13 | AP13 |
| S14 | SP14 | P14 | AP14 |
| S15 | SP15 | P15 | AP15 |
| S16 | SP16 | P16 | AP16 |

The step of reconfiguring data in the buffer (e.g., at step 211) identifies one or more storage locations for new data samples from among the plurality of buffer locations in the buffer. As noted above, the fixed capacity of the buffer may limit the number of buffer locations that are available to receive, store, and/or retain new data samples. The method can move, shift, discard, and/or overwrite previously-stored data samples found in the buffer locations. This feature configures the buffer to accommodate new data samples that are in excess of the fixed capacity of the buffer. In some embodiments, the method 200 may incorporate steps for moving previously-stored data samples from one buffer location to another (e.g., from a first buffer location to a second buffer location), thereby allocating one or more buffer locations (e.g., the first location) as a storage location that is available to receive, store, and/or retain one or more of the new data samples. Other embodiments may overwrite previously-stored data samples in certain of the buffer locations to accommodate the new data samples.

Figure 7:
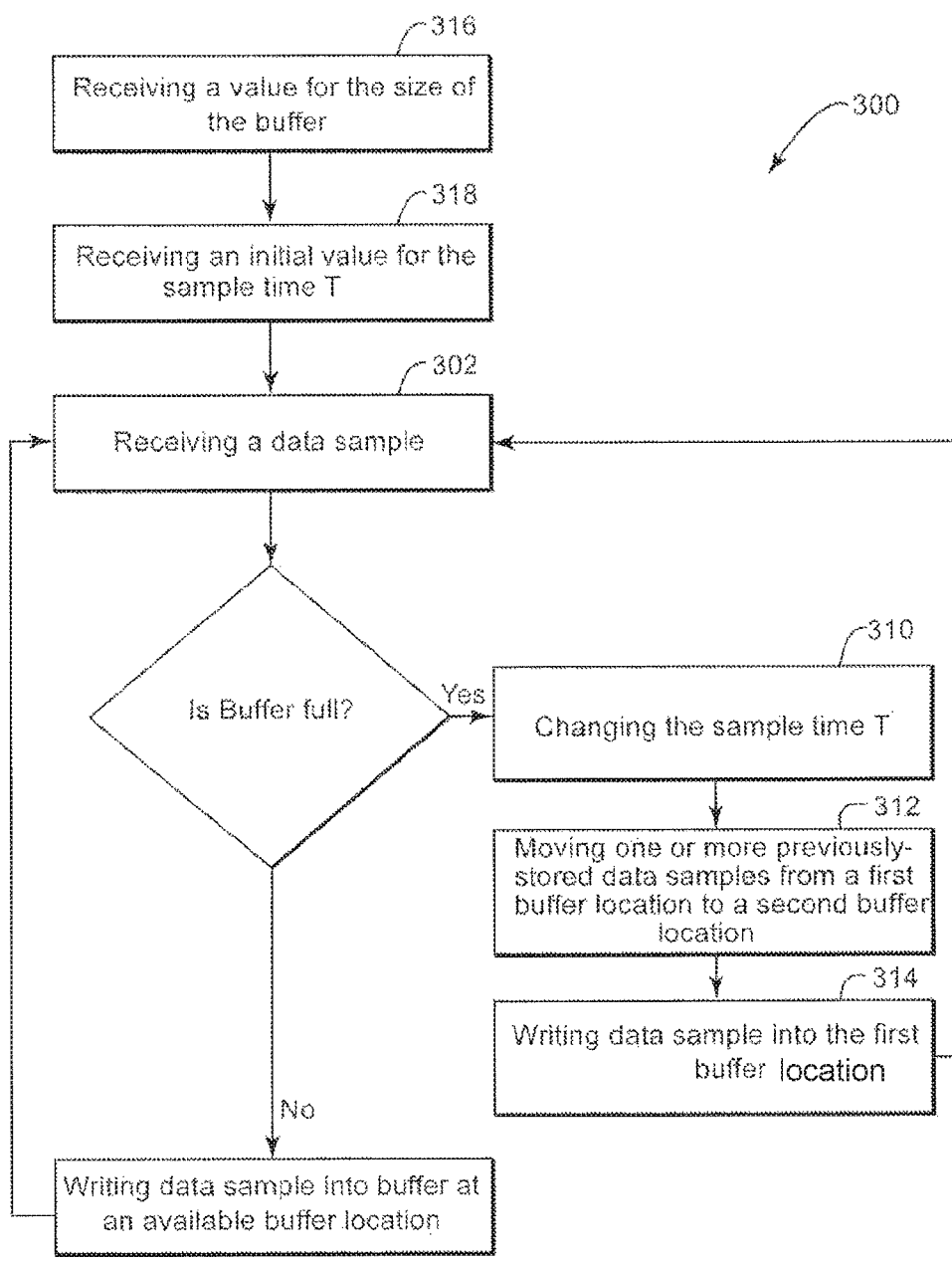
FIG. 7 depicts a flow diagram of an exemplary embodiment of a method that incorporates an example of a data write control protocol to write data samples in to a buffer of fixed length.

FIG. 7 illustrates a flow diagram of an exemplary embodiment of a method 300 that illustrates details of an exemplary method that is useful to store new data samples in a buffer of fixed size. The method 300 includes, at step 312, moving one or more previously-stored data samples from one buffer location (e.g., the first buffer location) in the buffer to another buffer location (e.g., the second buffer location) in the buffer. The method 300 also includes, at step 314, writing the data sample into the first buffer location. The method 300 can continue, at step 302 to receiving the next data sample. In one embodiment, the method 300 can also include, at step 316, receiving a value for the size of the buffer and, at step 318, receiving an initial value for the sample time T.

Figure 8:
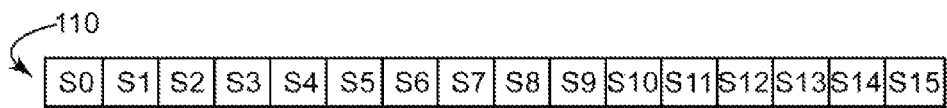
FIG. 8 depicts an example of a buffer having a fixed length and with data samples in a first configuration.

FIGS. 8, 9, 10, and 11 depict an example of the buffer 110 to illustrate one implementation of the method 300. The buffer 110 has a fixed capacity with the size of the buffer having a value of sixteen (i.e., there are sixteen buffer locations). In FIG. 8, the buffer 110 is shown in a first configuration, or "full condition," in which each of the buffer locations contain previously-stored data samples (e.g., data samples S0, S1, S2, S3, S4, S5, S6, S7, S8, S9, S10, S11, S12, S13, S14, S15 of Table 2). The first configuration 132 of the buffer 110 has no available buffer locations for any additional data samples (e.g., data sample S16 of Table 1). For purposes of the present example, the method 300 may include steps for querying each of the buffer locations in the buffer to recognize the presence or absence of previously-stored data samples and/or to utilize other techniques that can indicate the state, condition, and/or other feature of the buffer locations, and/or the buffer in general, to receive, store, and retain new data samples therein.

Figure 9:
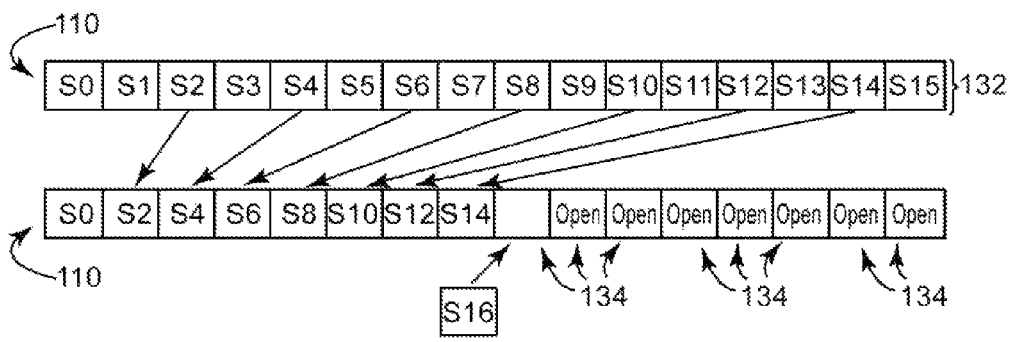
FIG. 9 depicts the buffer of FIG. 8 with data samples in the first configuration and a second configuration that results from execution of the method of FIG. 7.

The step of moving the previously-stored data samples (e.g., at step 312) modifies the configuration of the buffer 110 to address the "full" condition. This feature can allocate one or more of the buffer locations as storage locations 134 (or "open" locations 134) in order for the buffer 110 to receive, retain, and/or store the new data sample. As best shown in FIG. 9, the method 300 can move a plurality of the previously-stored data samples, which in turn modifies the buffer 110 from the first configuration 132 (in the "full condition") to the second configuration 136 that incorporates a plurality of empty storage locations, generally denoted as "open," which can receive the data sample S16 (and any subsequent data samples as desired). In one embodiment, the method 300 may include one or more steps for selecting the previously-stored data samples. The selected previously-stored data samples can be moved to other buffer locations (and/or discarded). In one example, the method 300 can move previously-stored data samples that correspond to a sample location that is an even number (e.g., data samples S2, S4, S6, S8, S10, S12, and S14). The method 300 can also include one or more steps for identifying a new buffer location for the selected previously-stored data samples. The method 300 may use the sample location to determine the new buffer location, e.g., wherein the new buffer location corresponds to buffer locations with previously-stored data samples that are proportional, fractional, and/or other relevant equivalents of the sample location for the selected previously-stored data samples. In one example, the method 300 can utilize a new buffer variable and, in a particular embodiment, the method 300 applies the new buffer variable as set forth in Equation (1) below:

$$SI_{NB} = \frac{SI_{SDS}}{F},$$ Equations (1)

wherein $SI_{NB}$ is the sample location of the new buffer location (e.g., second buffer location) for the previously-stored data, $SI_{SDS}$ is the sample location of the previous buffer location (e.g., the first buffer location) for the selected previously-stored data sample to be moved, and F is the new buffer variable. In one example, the new buffer variable F is 2, i.e., the sample location for the previously-stored data sample in the new buffer location is one-half the sample location of the selected previously-stored data sample to be moved.

Figure 10:
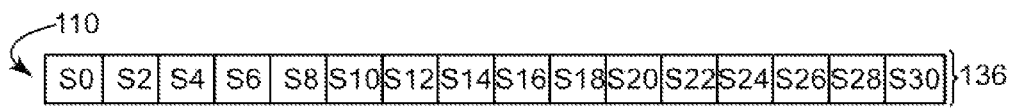
FIG. 10 depicts the buffer of FIG. 9 with data samples in a first configuration.
Figure 11:
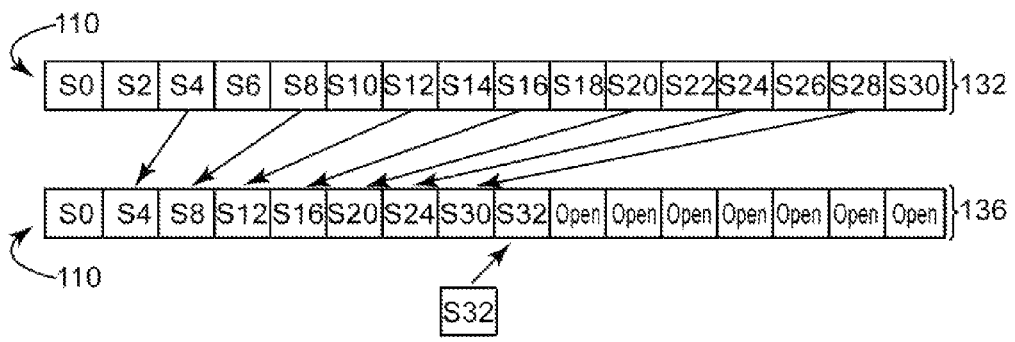
FIG. 11 depicts the buffer of FIG. 10 with data samples in the first configuration and a second configuration that results from execution of the method of FIG. 7.

The step of changing the sample time T (e.g., at step 310) allows the method 300 to fill the allocated buffer locations (i.e., the "open" buffer locations in FIG. 9) with additional data points that are approximately equally chronologically spaced from one another. As noted above, the method 300 can increase the sampling time T whenever the buffer 110 reaches the "full condition." FIG. 10 illustrates an example of the buffer 110 in the second configuration 136 that results from increasing the sample time T from a first sample time to a second sample time. The method 300 can employ a sample time variable S and, in a particular embodiment, the method 300 applies the sample time variable as set forth in Equation (2) below:

$$T_i = S \times T_{i-1},$$ Equation (2)

where $T_i$ is the new sample time, $T_{i-1}$ is the previous sample time, and S is the sample time variable. In one example, the sample time variable S is 2, thereby doubling the sample time T (i.e., from T to 2T, from 2T to 4T, etc.). The method 300 can increase the sample time T each time the buffer location for the new data sample corresponds with the last location (e.g., the end buffer location 128 of FIGS. 2, 3, and 4) in the buffer. As shown in FIG. 10, embodiments of the method 300 fill the buffer 110 with the new data samples S18, S20, S22, S24, S26, S28, S30. For the next new data sample (i.e., data sample S32), the method 300 again operates to moves one or more of the previously-stored data samples (e.g., at step 310) and increases the sample time T (e.g., at step 314) from 2T to 4T. FIG. 11 illustrates the buffer 110 in a first configuration 132 and in a second configuration 136, which includes the data sample S32 (taken or acquired at the sample time 2T) and data samples S36, S40, S44, S48, S52, S56, S60 (taken or acquired at the sample time 4T). In one implementation, this technique results in a buffer in which all of the stored data represents samples taken (or sampled) at the same or nearly the same sample rate.

As noted above, embodiments of the method 300 move previously-stored data samples within the buffer to free additional buffer locations to receive new data samples. This feature is particularly useful for small, or relatively small, buffers in which movement of only a small number of previously-stored data samples is required to maintain data acquisition. On the other hand, for larger buffers, movement of data may not occur in a timely or efficient manner to accommodate the related data sampling that is required for efficient data collection from, for example, a valve assembly. Thus, in some embodiments, including embodiments discussed below, methods of the present disclosure are also configured to selectively move (or shift) previously-stored data samples in the buffer, thereby reducing the time needed to configure the buffer to receive additional, new data samples.

Figure 12:
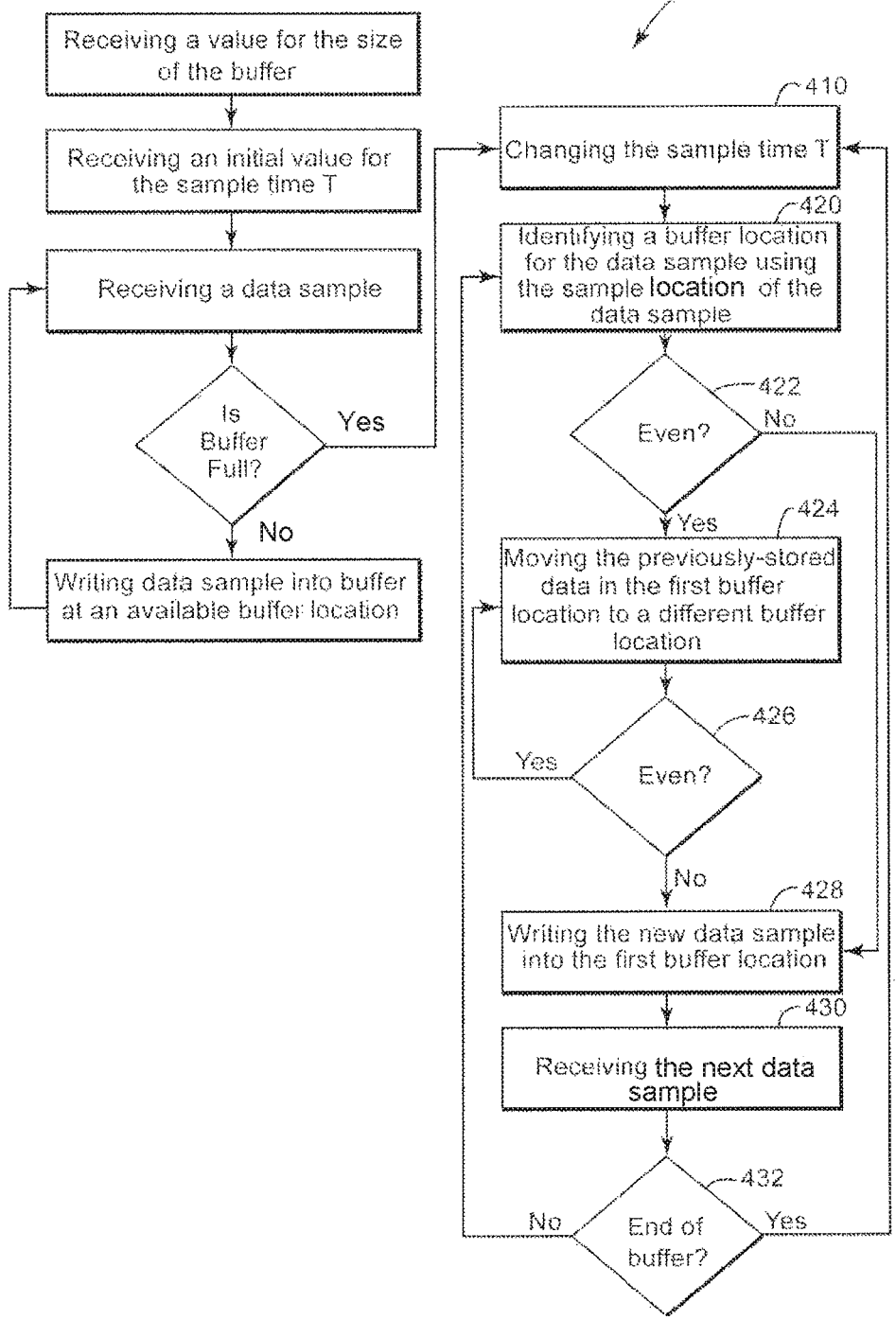
FIG. 12 depicts a flow diagram of an exemplary embodiment of a method that incorporates an example of a data write control protocol to write data samples in to a buffer of fixed length.

FIG. 12 depicts a flow diagram of another exemplary embodiment of a method 400 that is configured to split the process for moving data into smaller periods of time. In this example, the method moves only the previously-stored data samples that are necessary to accommodate the new data sample. The method 400 includes, at step 420, identifying a buffer location (e.g., the first buffer location) for the data sample using the sample location of the data sample and, at step 422, determining whether the sample location of the previously-stored data sample in the first buffer location is even. If the sample location for the previously-stored data in the first buffer location is even, then the method 400 can execute a series of steps to shift previously-stored data in the buffer. These steps may include, at step 424, moving the previously-stored data in the first buffer location to a different buffer location (e.g., a second buffer location) and, at step 426, determining whether the sample location for the previously-stored data in the different buffer location is even. If the sample location for the previously-stored data in the second buffer location is even, then the method 400continues, at step 424, moving the previously-stored data sample in the second buffer location to a different buffer location (e.g., a third buffer location), and so on until the sample location for the previously-stored data sample in the different buffer is not even. In the case that the sample location for the previously-stored data sample is not even, then the method 400 can continue, at step 428, writing the new data sample into the first buffer location (identified at step 420), at step 430, receiving the next data sample, at step 432, determining whether the first buffer location is the end buffer location. If the first buffer location is not the end buffer location, then the method400 continues, at step 420, identifying a buffer location (e.g., the first buffer location) for the data sample using the sample location of the data sample. On the other hand, if the first buffer location is the end buffer location, then the method 400 continues, at step 410, changing the sample time, and the process continues.

Figure 13:
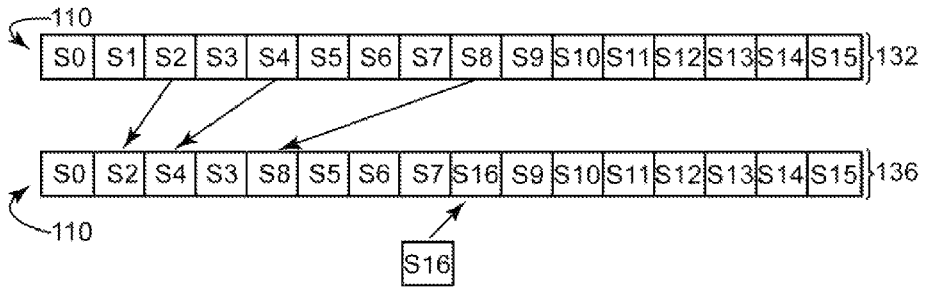
FIG. 13 depicts an example of a buffer having a fixed length in a first configuration and a second configuration that results from execution of the method of FIG. 12.
Figure 14:
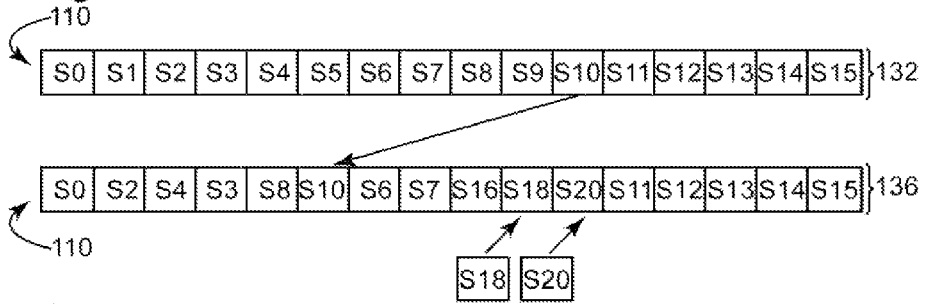
FIG. 14 depicts the buffer of FIG. 13 in the second configuration with additional data samples written therein.
Figure 15:
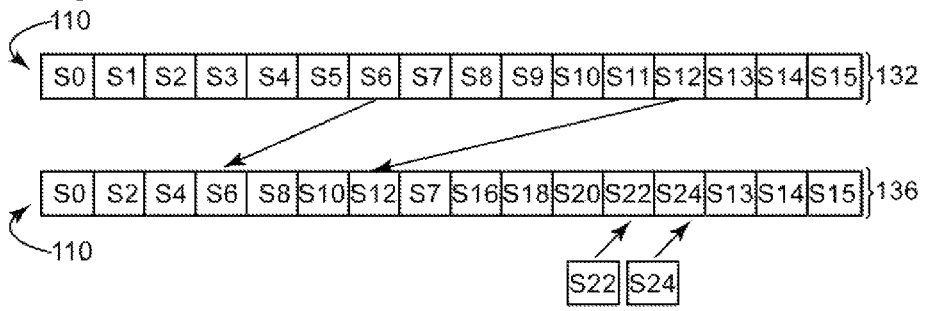
FIG. 15 depicts the buffer of FIG. 13 in the second configuration with additional data samples written therein
Figure 16:
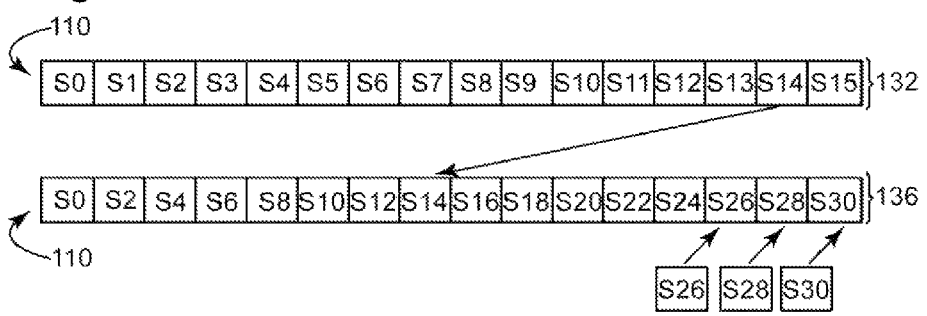
FIG. 16 depicts the buffer of FIG. 13 in the second configuration with additional data samples written therein.

FIGS. 13, 14, 15, and 16 depict an example of the buffer 110 to illustrate one implementation of the method 400. These figures illustrate the shifting and/or moving of various previously-stored data within the buffer 110 to accommodate for the new data samples. In FIG. 13, the buffer 110 is shown in the first configuration 132 and the second configuration 136. In the second configuration, the buffer 110 includes the new data sample S16 and the previously-stored data samples S2, S4, and S8 in new buffer locations (and samples S10, S12, and S14 are still in their original positions). As best shown in FIG. 14, the method 400 can write data sample S18 into the buffer at the buffer location for the previously-stored data sample S9, however, the method 400 overwrites the previously-stored data sample S9 (with the new data sample S18) because the sample location that corresponds to the buffer location for the new data sample S18 (in this case, 9) is an odd number. The method 400 can write data sample S20 into the buffer at the buffer location for the previously-stored data sample S10. However, the method 400 shifts the previously-stored data sample S10 to a new buffer location (i.e., the buffer location for the previously-stored data sample S5) because the sample location that corresponds to the buffer location for the previously-stored data sample S10 (in this case, 10) is an even number. The method 400 does not move the previously-stored data sample S5 because the sample location that corresponds to the buffer location for the previously-stored data sample S5 (in this case, 5) is an odd number. FIGS. 15 and 16 depict the buffer 110 with the addition of new data samples S22, S24, S26, S28, S30 along with the shifting of previously-stored data samples associated therewith.

Figure 17:
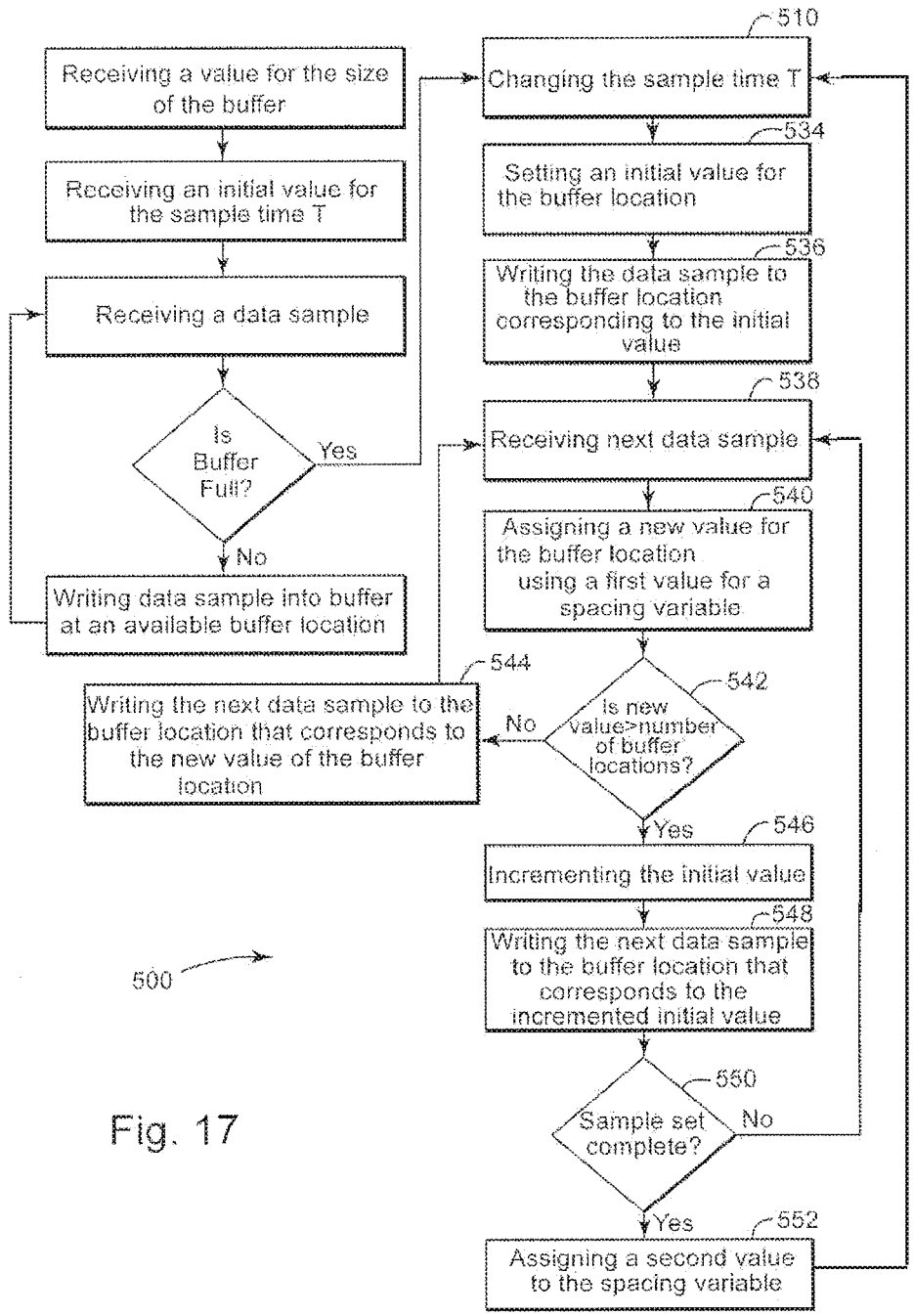
FIG. 17 depicts a flow diagram of an exemplary embodiment of a method that incorporates an example of a data write control protocol to write data samples in to a buffer of fixed length.
Figure 18:
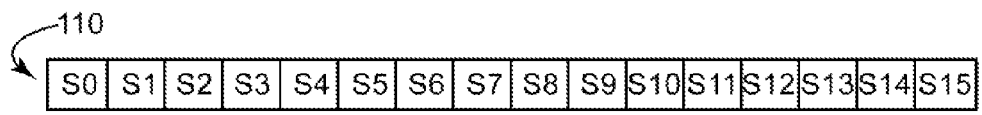
FIG. 18 depicts an example of a buffer having a fixed length and with data samples in a first configuration.

FIG. 17 depicts a flow diagram of another exemplary embodiment of a method 500 to illustrate details of an exemplary method that is configured to forgo steps for moving data altogether. The method 500 includes, at step 534, setting an initial value for the buffer location and, at step 536, writing the data sample to the buffer location corresponding to the initial value. The method 500 also includes, at step 538, receiving the next data sample, at step 540, assigning a new value for the buffer location using a first value for a spacing variable, and, at step 542, determining whether the new value for buffer location exceeds the number of buffer locations in the buffer. If the new value does not exceed the number of buffer locations, then the method 500 can continue, at step 544, writing the next data sample to the buffer location that corresponds to the new value of the buffer location and, at step538, receiving the next data sample. These steps can incrementally increase the value of the buffer location, for example, in accordance with Equation (3) below:

$$BLI_i = BLI_{i-1} + SV, \qquad \text{Equation (3)}$$

where $BLI_i$ is the new value of the buffer location, $BLI_{i-1}$ is the previous value for the buffer location, and SV is the spacing variable.

On the other hand, if the new value of buffer location exceeds the number of buffer locations in the buffer, then the method 500 can continue, at step 546, incrementing the initial value, at step 548, writing the next data sample to the buffer location that corresponds to the incremented initial value and, at step 550, determining whether a desired number of data samples (i.e., the number of samples in the sample set) have been collected. If not, then the method 500 continues, at step 538, receiving the next data sample. If the desired number of data samples have been collected, then the method 500 can continue, at step 552, to assigning a value to the spacing variable and, at step 510, assigning a value to the sample time T.

Figure 19:
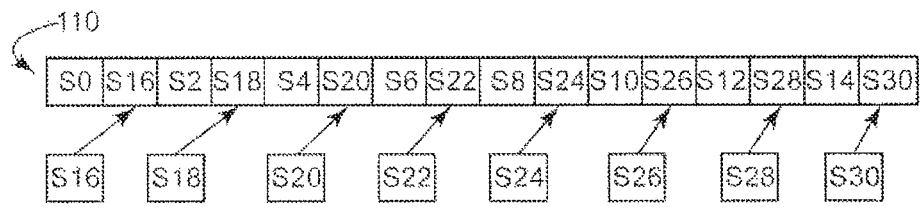
FIG. 19 depicts the buffer of FIG. 18 in a second configuration that results from execution of the method of FIG. 17.

FIGS. 18, 19, 20, and 21 depict the buffer 110 to illustrate one implementation of the method 500 to write data therein. In FIG. 19, the method 500 writes the data sample S16 into the buffer 110 at the buffer location B2 (i.e., with an initial value for the buffer location of two). The method 500 also writes subsequent data samples in the sample set (i.e., data samples S18, S20, S22, S24, S26, S28, S30) in the buffer 110, utilizing a value of two for the spacing variable (i.e., data sample S18 is stored in buffer location B4, data sample S20 is stored in buffer location B6, etc.). In one example, the number of data samples in the sample set is determined in accordance with Equation (4) below, $$SS = \frac{B}{D}, \qquad \text{Equation (4)}$$

where SS is the size of the sample set, B is the number of buffer location, and D is a deterministic variable to set the size of the sample set, as desired.

Figure 20:
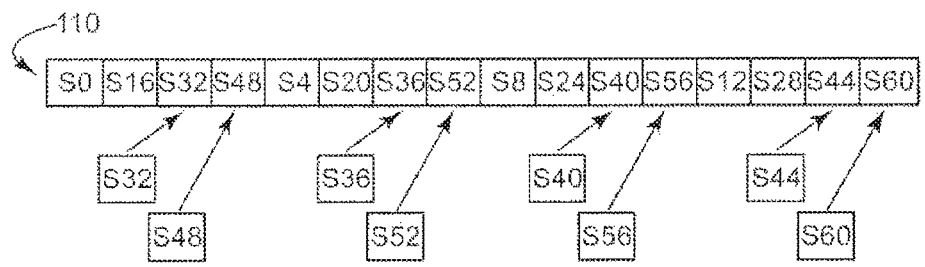
FIG. 20 depicts the buffer of FIG. 19 in the second configuration that results from execution of the method of FIG. 17.
Figure 21:
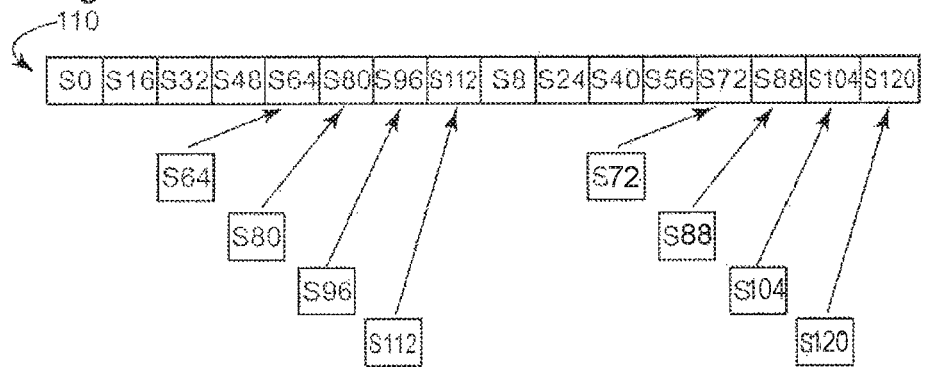
FIG. 21 depicts the buffer of FIG. 19 in the second configuration that results from execution of the method of FIG. 17.

As best shown in FIG. 20, the method 500 can write data sample S32 in the buffer location B3 adjacent the buffer location B2 for the data sample S16, i.e., the method 500 increments the initial value from B2 to B3. The method 500 can then write subsequent data samples S36, S40, S44 into the buffer utilizing a spacing variable of four (e.g., at step 548). To continue the sample set, the method 500 writes the data sample S48 in the buffer location adjacent for the data sample S32, i.e., the method 500 increments the initial value from B3 to B4, and then writes subsequent data samples S52, S56, and S60 into the appropriate buffer locations as set out by the spacing variable. Moreover, as noted in FIG. 21, the method 500 also writes the last data sample S64 in the sample set into buffer, incrementing the initial value from B4 to B5 and, as indicated by the data samples S72, S80, S88, S96, S104, S112, S120, the method 500 increases the sample time T and spacing variable SV to continue the general patterning of data samples into the buffer 110.

Use of the method 500 reconfigures and stores (and/or retains) data in the buffer in a non-sequential order. To this end, when data is retrieved from the buffer 110 after data storage via the method 500, data must be retrieved correctly to return the data in time order of the data samples. In one example, the method 500 may include one or more steps for retrieving the data, which may require recognizing (and/or understanding) the last sample time multiplier. For the exemplary buffer illustrated in FIGS. 18, 19, 20, 21, the last sample time multiplier is eight (i.e., a sample time of 8T). Thus, the steps to retrieve the data can start at the first buffer location B1 and, incrementing by eight, returns data samples S0 and S8. The next incremental buffer location is B16, which is in the buffer and thus requires the start location to increment by one (i.e., from B1 to B2). In this manner, the data retrieval process can return data samples at locations B2 and B10, giving S16 and S24, and the process continues by incrementing the start location from B2 to B3 and retrieving data samples S32 and S40 from locations B3 and B11.

Figure 22:
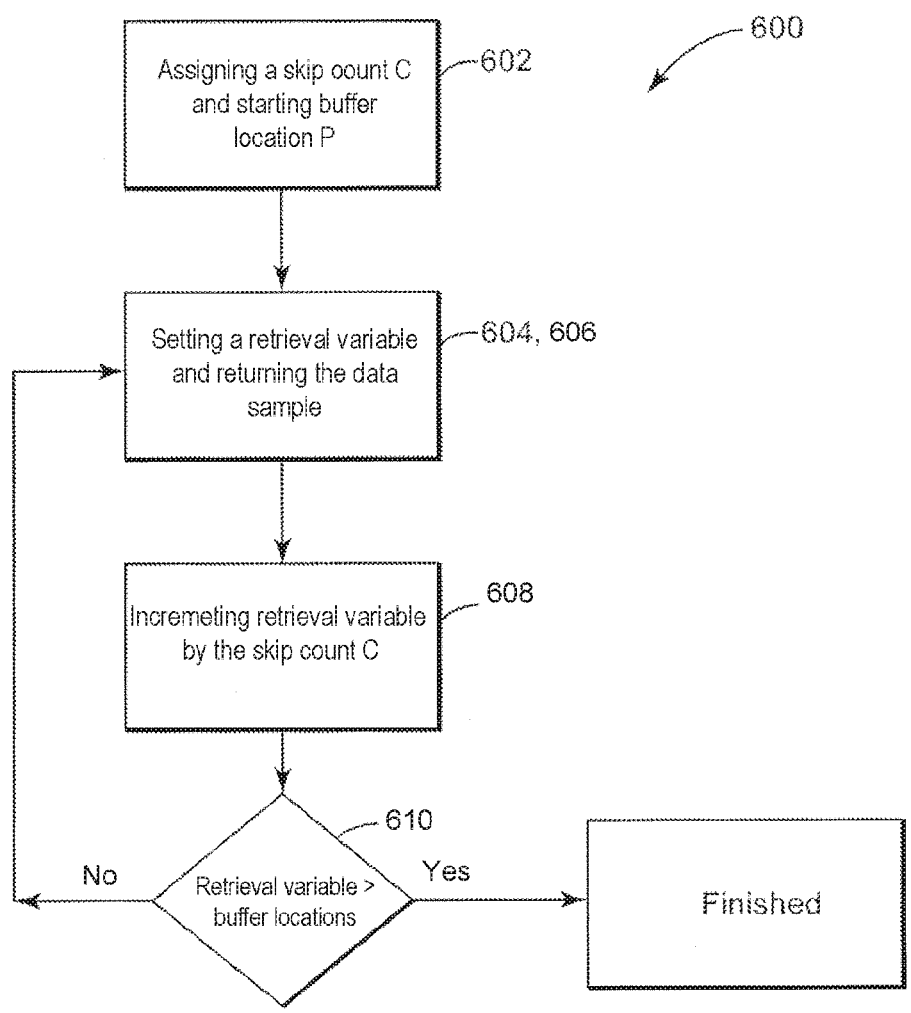
FIG. 22 depicts a flow diagram of an exemplary embodiment of a method for retrieving data samples out of a buffer of fixed length.
Figure 23:
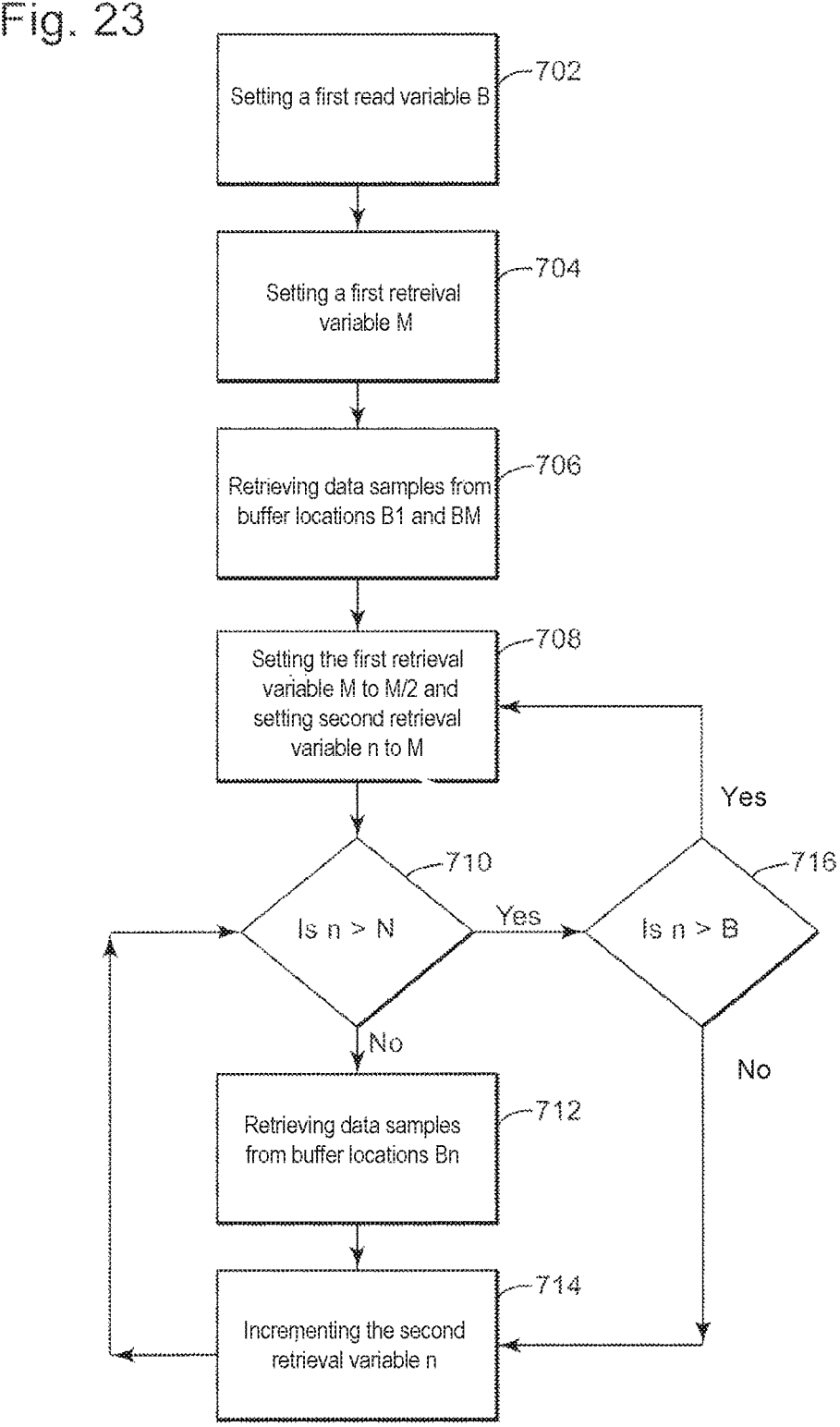
FIG. 23 depicts a flow diagram of an exemplary embodiment of a method for retrieving data samples out of a buffer of fixed length.

FIGS. 22 and 23 illustrate examples of a method 600 (FIG. 22) and a method 700 (FIG. 23) that are also useful to retrieve data from the buffer subject to one or more of the methods contemplated herein. In FIG. 22, the method 600 includes, at step 602, assigning a skip count C and a starting buffer location P. The method 600 also includes, at 604 setting a retrieval variable to the starting buffer location P and, at step 606, returning the data sample from the buffer location identified by the retrieval variable. The method 600 also includes, at step 608, incrementing the retrieval variable by the skip count C, at step 610, determining whether the retrieval variable exceeds the number of buffer locations in the buffer. If the retrieval variable does not exceed the number of buffer locations, then the method 600 continues to retrieve data samples and increment the retrieval variable.

The method 700 of FIG. 23 includes, at step 702, setting a first read variable B to a power of two that is equal to or greater than N, wherein N is the number of sampled points to be read. The method 700 also includes, at step 704, setting a first retrieval variable M to B/2 (where B is the number of buffer locations). The method 700 further includes, at step 706, retrieving data samples from buffer location B1 and Bm. In one embodiment, the method 700 continues, at step 708, setting the first retrieval variable m to m/2 and setting a second retrieval variable n to m, and, at step 710, determining whether the second retrieval variable is greater than the number of sample points N. If not, then the method 700 continues, at step 712, retrieving data samples from buffer location Bn, at step 714, incrementing the second retrieval variable n (e.g., by 2m), and continuing to step 710. On the other hand, if the second retrieval variable is greater than the number of sample points and greater than the number of buffer locations (e.g., at step 716), then the method 700 continues, at 708, to setting the first retrieval variable m and the second retrieval variable n.

Figure 24:
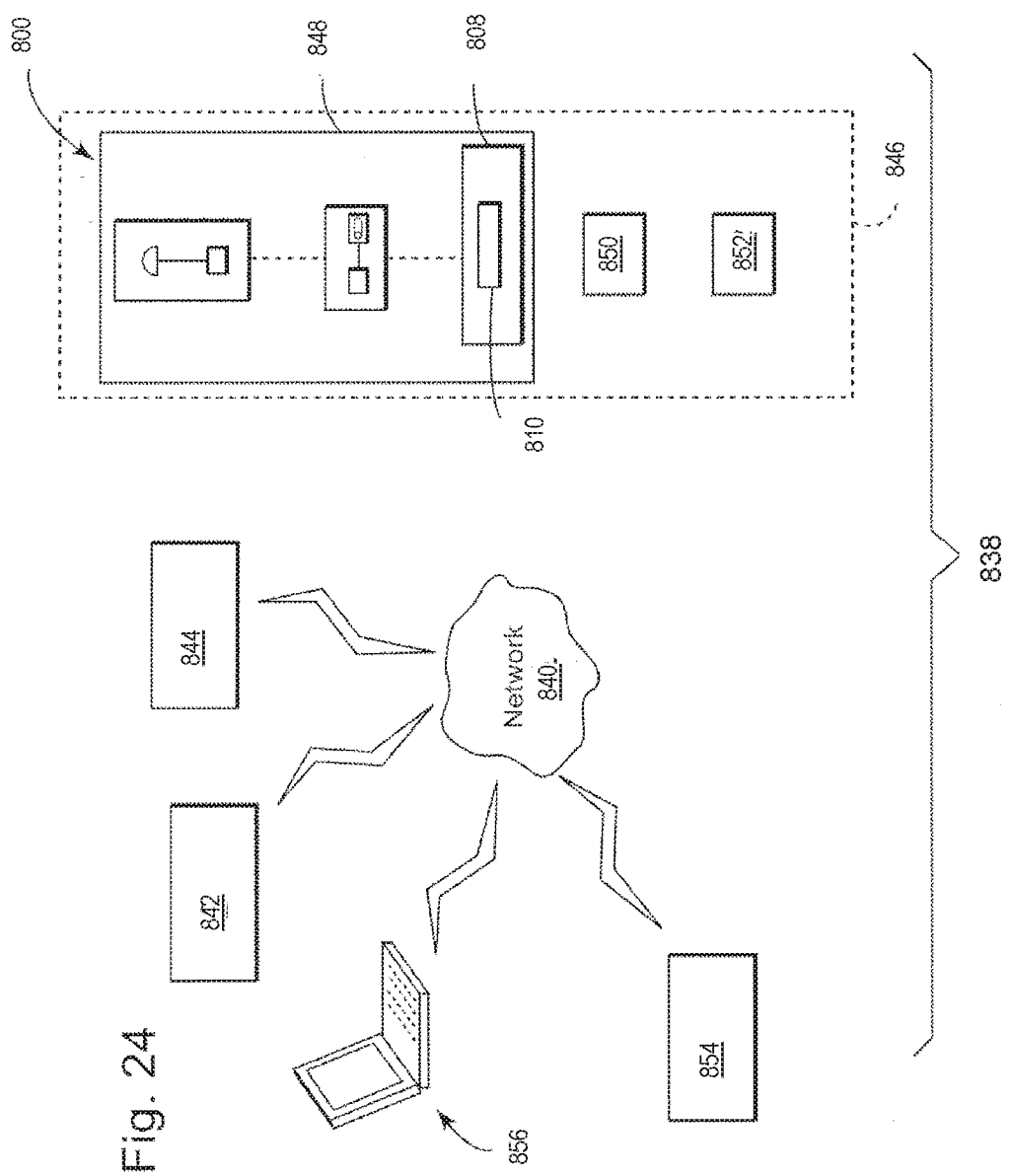
FIG. 24 depicts a schematic diagram of an exemplary embodiment of a system that is configured to can facilitate data collection for use in valve diagnostics as part of a process system having a process line.

FIG. 24 illustrates an exemplary embodiment of a system 800 as part of a process system 838 found, commonly, at industrial plants, facilities, and factories. The process system 838 includes a network 840 that may deploy various wired and wireless constructions to facilitate the exchange of data and information In many facilities, for example, the constructions utilize HART®, FOUNDATION® Fieldbus, and like communication protocols among components of the process system 838. These components may include a process controller 842, a management server 844, and a process line 846 with one or more process devices (e.g., a first device 848, a second device 850, and a third device 852). As contemplated herein, one or more of the process device 848, 850, 852 can embody the structure of the valve assembly 858 (FIG. 25) to modulate flow of process fluids in the process line 846. The process system 838 may also include one or more external servers (e.g., a first external server 854) that are useful for data collection and storage and other peripheral functions. The process system 838 may further include one or more terminals (e.g., a first terminal 856). Examples of the first terminal 856 can include a variety of computing devices (e.g., personal computers, workstations, laptop computers, tablet computers, smartphones, etc.) that an end user can utilize to interface with the process controller 842, the servers 844 854, and/or the process devices 848, 850, 852.

The process controller 842 can be part of a distributed control system ("DCS") that issues commands over the network 840 to the process devices 848, 850, 852. For control valve assemblies, these commands can instruct the valve positioner to operate the actuator to modulate flow through the valve assembly. The management server 844(and/or the sever 854 and/or terminal 856) can communicate with process devices 848, 850, 852 through the DCS or, in one example, directly via the network 840. This configuration allows the management server 844 to collect and process data to provide, among other things, overall guidance as to the operation of the process line 846 (and, in certain configurations, the operation of components of the process system 838 and the process facility in general).

Components of the process system 838 may generate signals to the system 800 to solicit data for use in diagnostic processes. These signals may, for example, instruct the system 800 to communicate data most useful to determine the performance metrics discussed herein. In one implementation, the system 800 can generate an output that comprise all or part of the data that is stored in the buffer 810 (and the repository 808, generally), which as noted herein may include data identified by the system 800 as being most useful for valve diagnostics. The output may, in other examples, include other data, e.g., values for the quality measure, the first value of the diagnostic statistic, and/or the second value of the diagnostic statistic, which the components of the process system 838 may request from time-to-time, e.g., via the signals generated to the system 800.

Figure 25:
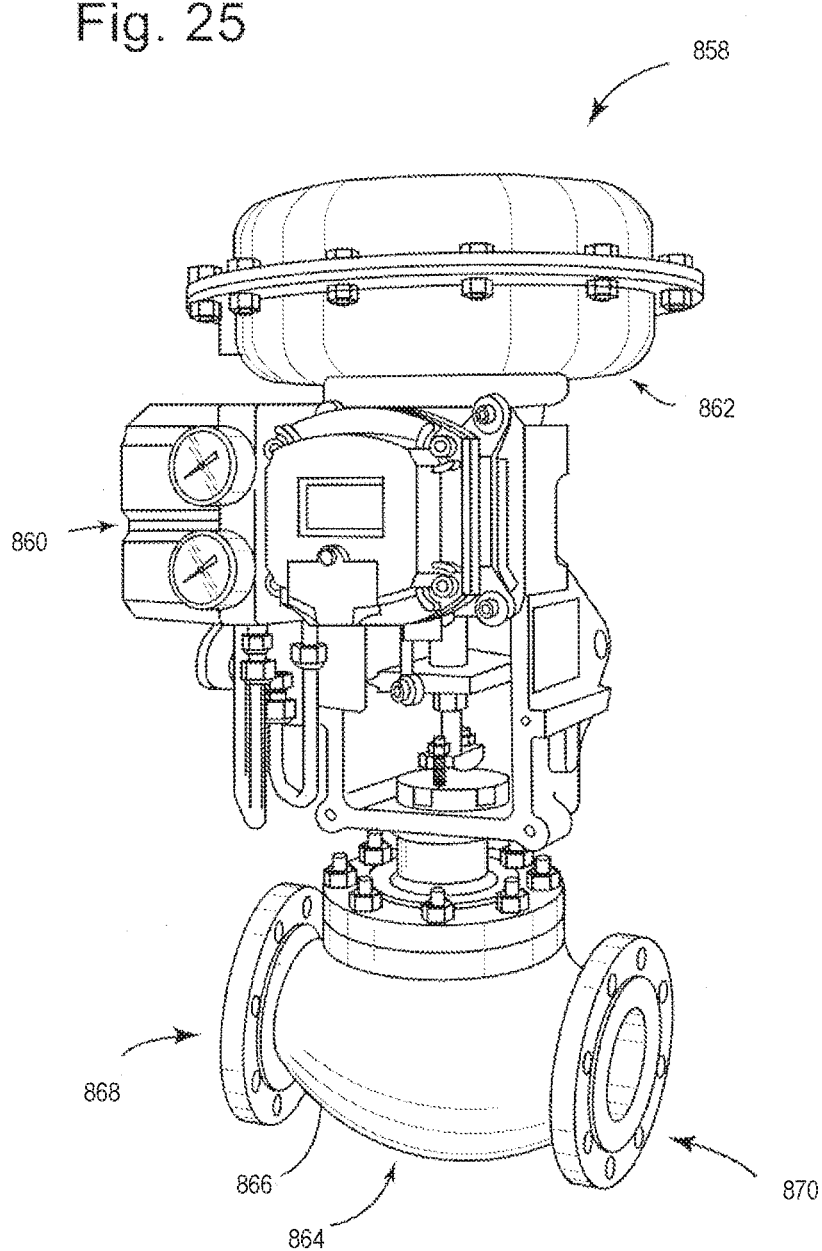
FIG. 25 depicts a perspective view of an example of a control valve assembly.
Figure 26:
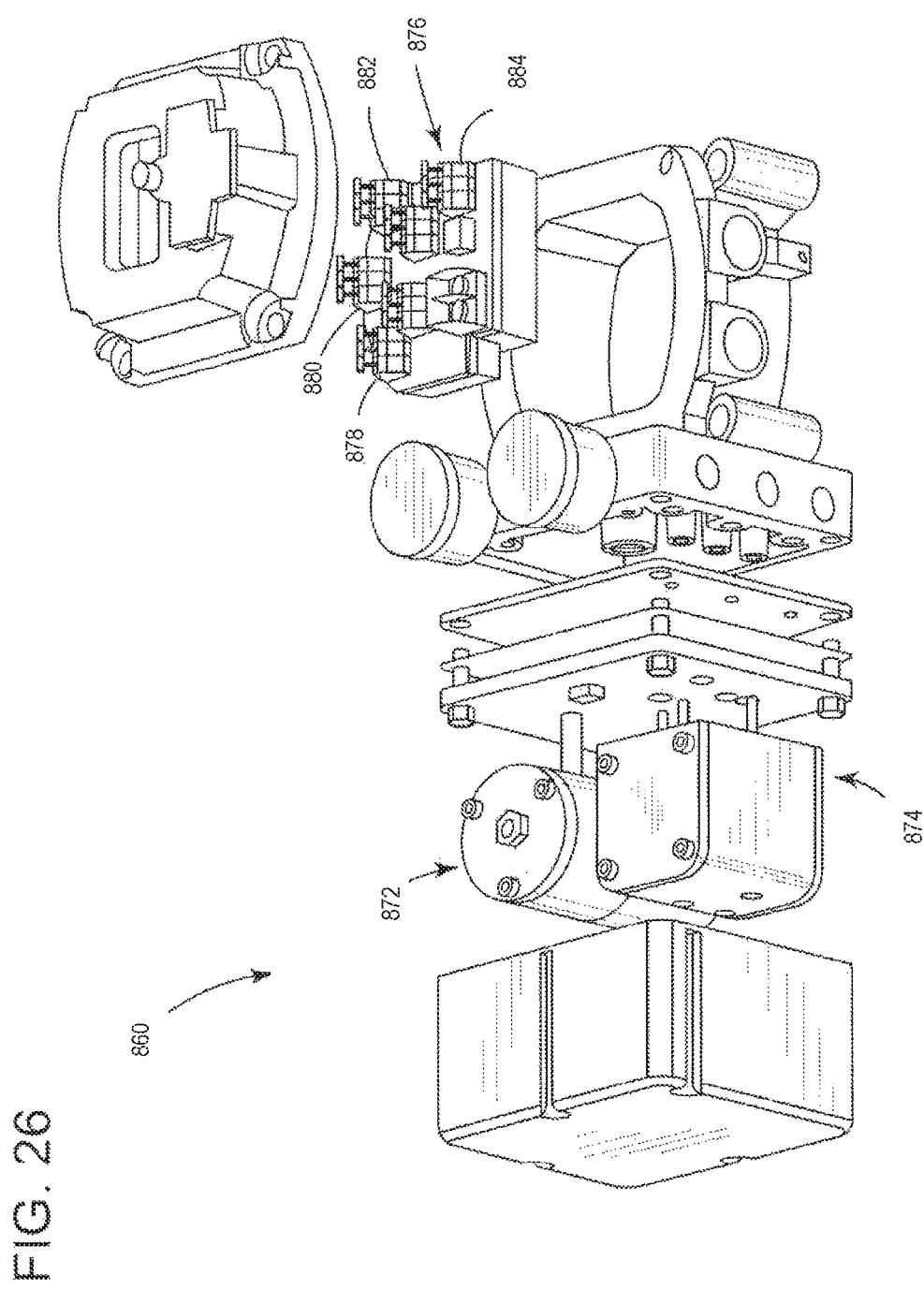
FIG. 26 depicts a perspective view of an example of a valve positioner in exploded form.

FIGS. 25 and 26 illustrate an exemplary embodiment of a system in the form of a control valve assembly 358. In FIG. 25, the control valve assembly 858 includes a valve positioner 860, an actuator 862, and a fluid coupling 864 with a body 866 that has a first inlet/outlet 868 and a second inlet/outlet 870. This structure is typical of devices that can modulate a flow of working fluid between the inlet/outlets 868, 870.

FIG. 26 depicts an example of the valve positioner 860 in exploded form. As shown in this diagram, the valve positioner 860 has a plurality of valve components (e.g., a converter component 872, a relay component 874, a processing component 876). The valve components 872, 874, 876 work in combination to maintain the position of a valve disposed in the body 866 (FIG. 25) to modulate fluid flow across the inlet/outlets 868, 870 (FIG. 25). In one example, the processing component 876 can include operative hardware with one or more processing units (e.g., a first processing unit 878, a second processing unit 880, a third processing unit 882, and a fourth processing unit 884).

Examples of the processing component 876 manage operation of the valve components 872, 874 to regulate flow of working fluid across the valve assembly 858 (FIG. 25). These examples can comprise one or more discrete components (e.g., resistors, transistors, capacitors, etc.) including processing units 878, 880, 882, 884 that reside on one or more substrates (e.g., a printed circuit board). These components may include one or more processors (e.g., an ASIC, FPGA, etc.) that can execute executable instructions in the form of software, computer programs, and firmware. These executable instructions can be stored on memory. In one embodiment, the processing component 876 can include one or more programmable switches, inputs that couple with sensors for position feedback, a proportional-integral-derivative (PID)

controller, a display (e.g., an LCD display), and like components that facilitate use and operation of the control valve assembly 858 (FIG. 25).

Embodiments of the various control and processing devices can comprise computers and computing devices with processors and memory that can store and execute certain executable instructions, software programs, and the like. These control devices can be a separate unit, e.g., part of equipment that control valves and other components in a process facility. In other examples, these control devices integrate with the valve, e.g., as part of the hardware (e.g., the valve positioner) and/or software configured on such hardware. In still other examples, these control devices can be located remote from the valve, e.g., in a separate location where the control device can receive information from sensors, issue commands and instructions using wireless and wired communication via a network.

One or more of the steps of the methods (e.g., method 200) can be coded as one or more executable instructions (e.g., hardware, firmware, software, software programs, etc.). These executable instructions can be part of a computer-implemented method and/or program, which can be executed by a processor and/or processing device. The processor may be part a component that is adapted to execute these executable instructions, as well as to process inputs and to generate outputs, as set forth herein. For example, the software can run on the valve assembly, valve positioner, and process system and/or as software, application, or other aggregation of executable instructions on a separate computer, tablet, lap top, smart phone, and like computing device.

Examples of a processor can integrate into the process line and/or reside remote from the process line as a standalone computing device, network, and like computing arrangement. The memory and the processor can include hardware that incorporates with other hardware (e.g., circuitry) to form a unitary and/or monolithic unit devised to execute computer programs and/or executable instructions (e.g., in the form of firmware and software). In other examples, these devices integrate, in whole or in part, with components of the valve assemblies, sampling devices, and other components contemplated herein.

Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Moreover, as will be appreciated by one skilled in the art, aspects of the present disclosure may be embodied as a system, method or computer program product. The embodiments can take the form of an entirely hardware embodiment, an entirely software embodiment (including firmware, resident software, micro-code, etc.) or an embodiment combining software and hardware aspects that may all generally be referred to herein as a "circuit," "module" or "system." For computer program products, the executable instructions may reside on one or more computer readable medium(s), for example, a non-transitory computer readable medium having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for storing data samples in a buffer having a plurality of buffer locations including a lead buffer location, an end buffer location, and one or more intermediary buffer locations disposed therebetween, said method comprising:
   at a device comprising a processor with access to memory having executable instructions stored thereon:
   receiving data samples at a sample time that defines a rate at which the data sample is received;
   changing the sample time from a first sample time to a second sample time that is longer than the first sample time;
   reconfiguring data in the buffer from a first configuration to a second configuration by moving previously-stored data samples from first buffer locations to second buffer locations that are different from the first buffer locations so as to create a plurality of available buffer locations in the buffer for data samples that correspond with the second sample time, the plurality of available buffer locations located at the first buffer locations; and
   writing the data samples into the buffer at the plurality of available buffer locations according to a chronological order of the data samples.

2. The method of claim 1, wherein the second buffer locations are selected according to, $$SI_{NB} = \frac{SI_{SDS}}{F},$$

wherein $SI_{NB}$ is the second buffer locations for the previously-stored data sample, $SI_{SDS}$ is the first buffer locations for the previously-stored data sample, and F is a new buffer variable that defines a relationship between the second buffer locations for the previously-stored data samples and the first buffer locations for the previously-stored data samples in the first buffer location.

3. The method of claim 2, wherein the new buffer variable has a value that identifies the second buffer locations for the previously-stored data samples as one-half the first buffer locations for the selected previously-stored data samples.

4. The method of claim 1, wherein the second sample time is calculated according to, $$T_i = S \times T_{i-1},$$

wherein $T_i$ is the second sample time, $T_{i-1}$ is the first sample time, and S is a sample time variable that defines an amount of increase of the sample time between the first sample time and the second sample time.

5. The method of claim 4, wherein the sample time variable doubles the sample time as between the first sample time and the second sample time.

6. A method for storing data samples in a buffer having a plurality of buffer locations including a lead buffer location, an end buffer location, and one or more intermediary buffer locations disposed therebetween, said method comprising:
at a device comprising a processor with access to memory having executable instructions stored thereon:
receiving data samples at a sample time that defines a rate at which the data sample is received;
reconfiguring data in the buffer from a first configuration to a second configuration by
identifying values for available buffer locations relative to the plurality of buffer locations using a spacing variable that describes spacing between adjacent buffer locations in the buffer that receive the data samples,
writing the data samples into the buffer at the plurality of available buffer locations, and
changing the spacing variable from a first value to a second value that is different from the first value; and
increasing the sample time from a first sample time to a second sample time that is longer than the first sample time.

7. The method of claim 6, wherein the buffer locations increase according to, $$BLI_i = BLI_{i-1} + SV,$$

where $BLI_i$ is a subsequent buffer location, $BLI_{i-1}$ is a previous buffer location, and SV is the spacing variable.

8. A method for storing data samples in a buffer having a plurality of buffer locations including a lead buffer location, an end buffer location, and one or more intermediary buffer locations disposed therebetween, said method comprising:
at a device comprising a processor with access to memory having executable instructions stored thereon:
receiving data samples at a sample time that defines a rate at which the data sample is received;
changing the first sample time to a second sample time that is longer than the first sample time;
reconfiguring data in the buffer to create a plurality of available buffer locations in the buffer that can receive the data samples by,
moving previously-stored data samples from first buffer locations that are even to second buffer locations that are different from the first buffer locations, wherein the plurality of available buffer locations are located at the first buffer locations; and
writing the data samples into the buffer at the plurality of available buffer locations according to a chronological order of the data samples.

9. The method of claim 8, wherein the second buffer locations for the previously-stored data samples is one half the first buffer locations for the previously-stored data samples.

10. The method of claim 8, wherein the sample time doubles from the first sample time to the second sample time.

11. A method for storing data samples in a buffer having a plurality of buffer locations including a lead buffer location, an end buffer location, and one or more intermediary buffer locations disposed therebetween, said method comprising:
at a device comprising a processor with access to memory having executable instructions stored thereon:
receiving data at a sample time that defines a rate at which the data is received;
storing data samples as part of a sample set in buffer locations starting with a first buffer location and increasing incrementally from the first buffer location according to a first value for a spacing variable that describes spacing between adjacent buffer locations in the buffer that receive the data samples;
when the buffer is full, incrementing the first buffer location to a second buffer location and continuing to store subsequent data samples of the sample set starting at the second buffer location; and
increasing the sample time from a first sample time to a second sample time, which is longer than the first sample time, in response to the subsequent data samples exceeding a pre-determined number of data samples found in the sample set.

12. The method of claim 11, further comprising assigning a second value to the spacing variable, wherein the second value is larger than the first value in response to the subsequent data samples exceeding the pre-determined number of data samples in the sample set.

13. The method of claim 11, wherein the sample time doubles from the first sample time and the second sample time.

14. The method of claim 11, wherein sample time is calculated according to, $$T_i = S \times T_{i-1}$$

where $T_i$ is the second sample time, $T_{i-1}$ is the first sample time, and S is a sample time variable that defines an amount of increase of the sample time between the first sample time and the second sample time.

* * * * *